(12) United States Patent
Baldwin

(10) Patent No.: US 7,597,020 B2
(45) Date of Patent: Oct. 6, 2009

(54) GEAR SELECTION STRATEGY FOR A DUAL CLUTCH TRANSMISSION

(75) Inventor: Reid A. Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 447 days.

(21) Appl. No.: 11/591,720

(22) Filed: Nov. 2, 2006

(65) Prior Publication Data

US 2007/0051196 A1    Mar. 8, 2007

Related U.S. Application Data

(63) Continuation-in-part of application No. 11/083,250, filed on Mar. 17, 2005, now Pat. No. 7,246,536.

(51) Int. Cl.
*F16H 3/097* (2006.01)
(52) U.S. Cl. .......................... 74/336 R; 74/330; 74/331
(58) Field of Classification Search .................. 74/340; 477/70
See application file for complete search history.

(56) References Cited

U.S. PATENT DOCUMENTS

| | | | |
|---|---|---|---|
| 4,723,643 A | 2/1988 | Numazawa et al. | |
| 5,181,431 A | 1/1993 | Zaiser et al. | |
| 5,182,969 A * | 2/1993 | Goto | 477/120 |
| 6,285,941 B1 * | 9/2001 | Janecke | 701/55 |
| 6,318,530 B1 | 11/2001 | Asada | |
| 6,549,838 B2 | 4/2003 | O'Neil et al. | |
| 6,869,382 B2 | 3/2005 | Leising et al. | |
| 6,883,394 B2 | 4/2005 | Koenig et al. | |
| 6,887,184 B2 | 5/2005 | Buchanan et al. | |
| 6,929,107 B2 | 8/2005 | Hegerath | |
| 6,953,417 B2 | 10/2005 | Koenig | |
| 2002/0173894 A1 | 11/2002 | Gorys | |
| 2005/0204837 A1 * | 9/2005 | Janson et al. | 74/325 |
| 2005/0282683 A1 | 12/2005 | Tanba et al. | |
| 2006/0005647 A1 | 1/2006 | Braford et al. | |

FOREIGN PATENT DOCUMENTS

| | | |
|---|---|---|
| DE | 10109662 | 9/2002 |
| EP | 1266788 | 12/2002 |

* cited by examiner

*Primary Examiner*—Sherry L Estremsky
*Assistant Examiner*—Edwin A Young
(74) *Attorney, Agent, or Firm*—David B. Kelley; MacMillan, Sobanski & Todd, LLC

(57) ABSTRACT

A method for controlling gear shifts in a multiple speed power transmission for a vehicle that includes a first clutch for transmitting power through a first power path producing a reverse gear, and a second clutch for transmitting power through a second power path producing a forward gear. The method includes selecting a reverse range in which the transmission is to operate, preparing the transmission to transmit power alternately through the first power path and second power path; engaging the first clutch and transmitting power through the first power path in the reverse gear, selecting a forward range in which the transmission is to operate, disengaging the first clutch and engaging the second clutch, and transmitting power through the second power path in the forward gear.

14 Claims, 7 Drawing Sheets

| Gear Number | Number of teeth |
|---|---|
| 30 | 17 |
| 32 | 17 |
| 34 | 87 |
| 38 | 45 |
| 40 | 29 |
| 42 | 37 |
| 44 | 41 |
| 46 | 31 |
| 48 | 32 |
| 50 | 34 |
| 52 | 18 |
| 54 | 25 |
| 56 | 41 |
| 58 | 33 |

Fig 2

| Gear | Coupler 60 | Coupler 62 | Coupler 64 | Clutch | Speed Ratio | Step Size |
|---|---|---|---|---|---|---|
| 1st | 46 | 42 | | 16 | 17.97 | |
| | | | | | | 1.70 |
| 2nd | | 42 | | 20 | 10.56 | |
| | | | | | | 1.60 |
| 3rd | | | 56 | 16 | 6.58 | |
| | | | | | | 1.50 |
| 4th | | 40 | | 20 | 4.38 | |
| | | | | | | 1.40 |
| 5th | 44 | | | 16 | 3.13 | |
| Reverse | 46 | | 58 | 16 | -16.03 | |

Fig 3

| Gear Number | Number of teeth |
|---|---|
| 30 | 21 |
| 32 | 25 |
| 34 | 92 |
| 70 | 61 |
| 72 | 43 |
| 74 | 51 |
| 76 | 24 |
| 78 | 67 |
| 80 | 36 |
| 82 | 41 |
| 84 | 26 |
| 86 | 71 |
| 88 | 54 |
| 90 | 43 |
| 92 | 51 |

Fig 5

| Gear | Coupler 94 | Coupler 96 | Coupler 98 | Coupler 100 | Clutch | Speed Ratio | Step Size |
|---|---|---|---|---|---|---|---|
| 1st |  | 74 | 86 |  | 20 | 17.88 |  |
|  |  |  |  |  |  |  | 1.64 |
| 2nd |  |  | 86 |  | 16 | 10.89 |  |
|  |  |  |  |  |  |  | 1.51 |
| 3rd |  |  |  | 92 | 20 | 7.22 |  |
|  |  |  |  |  |  |  | 1.38 |
| 4th | 72 |  |  |  | 16 | 5.23 |  |
|  |  |  |  |  |  |  | 1.36 |
| 5th |  |  |  | 90 | 20 | 3.86 |  |
|  |  |  |  |  |  |  | 1.30 |
| 6th |  |  | 88 |  | 16 | 2.97 |  |
|  |  |  |  |  |  |  | 1.26 |
| 7th |  | 74 |  | 90 | 16 | 2.35 |  |
| R1 | 70 | 74 |  |  | 20 | -18.29 |  |
|  |  |  |  |  |  |  | 1.64 |
| R2 | 70 |  |  |  | 16 | -11.13 |  |

Fig 6

GEAR SELECTION STRATEGY FOR A DUAL CLUTCH TRANSMISSION

CROSS-REFERENCE TO RELATED APPLICATION

This application is a continuation-in-part of the U.S. patent application Ser. No. 11/083,250, filed Mar. 17, 2005 now U.S. Pat. No. 7,246,536.

BACKGROUND OF THE INVENTION

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open hydraulic friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmissions, are limited in the rate at which they can dissipate the excess power. The amount transmission generally performs gear ratio changes by first interrupting torque transmitted from the engine to the transmission input, preparing the transmission components associated with the next speed ratio, and then restoring torque at the input. A primary functional feature of ASM transmissions is the need to interrupt power transmitted from the engine to the transmission input shaft before or during each gear ratio change.

Dual clutch layshaft transmissions are essentially two ASM transmissions, one providing odd numbered gears and one providing even numbered gears. Shifts between odd numbered gears and even numbered gears can be accomplished without interrupting power flow. While operating in an odd numbered gear, couplers can be actuated to configure the transmission for the next even numbered gear. Dual clutch transmissions have parasitic losses only slightly higher than ASM transmissions.

When a motor vehicle is accelerated from rest, the mechanical power generated by the engine exceeds the power utilized by the vehicle. The transmission must dissipate the difference, generally as heat. Open torque converters are very efficient at converting the excess mechanical power into heat in the working fluid. Friction clutches, as used in ASM and dual clutch of energy that must be dissipated is determined by the torque level, the speed difference across the clutch, and the duration of the event.

The most effective way to limit the power that must be dissipated by the clutch is to provide additional torque multiplication in the gearbox. This has two benefits. First, it reduces the torque which the clutch must transmit. Second, it reduces the duration of the event because the gearbox input will become equal to the engine speed at a lower vehicle speed. The need for similar top gear ratios, which is dictated by cruising fuel economy, is unchanged, so the resulting gearbox must have substantially more total span. The difference between adjacent gear ratios is limited by the ability to make comfortable shifts. As a result, it is also necessary to increase the number of discrete gear ratios.

Traditionally, one reverse ratio has been considered sufficient, since speed is relatively low and fuel efficiency in reverse is not a significant concern. However, if the gear multiplication is high enough to satisfy clutch thermal considerations, it may be excessive for normal reverse driving, even at those relatively low speeds. Therefore, it is beneficial to provide a reverse ratio similar to the traditional reverse ratio in addition to one that has much more multiplication.

One known way to increase the gear multiplication is to increase to ratio of the tooth counts for individual gear pairs. This would require increasing the distance between shafts due to limitations on how small the gears can be relative to the shaft diameter. Adding an additional forward and reverse ratio would ordinarily require at least four additional gears and an additional synchronizer sleeve. The resulting transmission would be much larger and likely would not fit into the package space available.

In a layshaft transmission, gears connected to a drive path moving sleeves on a coupler, such as a synchronizer. In a dual clutch transmission (DCT), one or two gears may be selected at any time, provided each gear is associated with a different input clutch. The clutch associated with the gear being selected or deselected must be disengaged while the coupler sleeve is moved.

In a DCT that includes a clutch coupler, operation in the lowest forward gear, first gear, requires that two synchronizers to be engaged: a second gear coupler and the clutch coupler. Similarly, operation in the lowest reverse gear, R1 gear, requires that a R2 coupler and the clutch coupler be engaged.

The sequence in which these couplers are engaged greatly influences the magnitude of coupler torque required. For example, if second gear is engaged first, the second gear coupler must accelerate only one clutch disc, and it has a moderate torque ratio to that clutch disc. On the other hand, if the clutch coupler is engaged first, subsequent engagement of the second gear coupler requires accelerating both clutch discs concurrently while overcoming a much larger torque ratio. This is particularly troublesome if the clutches are very cold, which causes them to have high drag.

There is a need in the automotive industry for a gear shift control strategy that ensures engagement of the clutch coupler is performed last.

Rock cycling the vehicle by moving the gear selector between the R-range and D-range is commonly used to move the wheels from snow, ice or mud. Preferably, the gear shift control strategy would only switch clutches and not move any coupler sleeves to switch from a forward ratio to a reverse ratio during rock cycling operation.

SUMMARY OF THE INVENTION

To meet the needs of the industry and to address the shortcomings of prior transmission gear shift controls, a method has been developed for controlling gear shifts in a multiple speed power transmission for a vehicle that includes a first clutch for transmitting power through a first power path producing a reverse gear, and a second clutch for transmitting power through a second power path producing a forward gear. The method includes selecting a reverse range in which the transmission is to operate, preparing the transmission to transmit power alternately through the first power path and second power path; engaging the first clutch and transmitting power through the first power path in the reverse gear, selecting a forward range in which the transmission is to operate, disengaging the first clutch and engaging the second clutch, and transmitting power through the second power path in the forward gear.

A transmission that may be controlled by the gear shift strategy may be configured similarly to a dual clutch transmission with modest span. However, a selectable torque path between the two input shafts is added such that, when this path is activated, the input shaft associated with even gears rotates slower than the input shaft associated with odd gears by a pre-determined ratio. This torque path requires a new synchronizer, but may re-use gearing that was already present. Depending on the layout of an original gearbox, it is often possible to combine this new synchronizer with an existing synchronizer to form a three position sleeve (connecting a shaft to either of two gears or neither of them).

First gear is engaged by activating the new synchronizer in combination with the second gear synchronizer and the odd gear clutch. If the existing reverse ratio is driven by the even gear input shaft, then an extra low reverse ratio is also created. This low reverse is engaged by activating the new synchronizer in combination with the reverse synchronizer and the odd gear clutch. In fact, there is an additional ratio created below every even numbered ratio in the original transmission. However, only the ratios below first and reverse provide utility.

In a similar manner, new ratios are created above each odd numbered ratio. These ratios are engaged by activating the new synchronizer in combination with the corresponding odd gear synchronizer and the even gear clutch. Of these, only the ratio higher than the highest odd numbered ratio provides utility. For example, there would be a ratio available higher than the fifth gear ratio. The step size from fifth to this new ratio is the same as the step size between first and second, which is too large to utilize as sixth gear. However, if a traditional sixth gear is present, this new ratio is useable as a seventh gear. This new gear ratio utilizes the same clutch as sixth gear ratio, so the final upshift must be accomplished with a torque interruption like an ASM.

In total, a five forward speed single reverse gearbox with modest span can be transformed into a gearbox with seven forward speeds, two reverse speeds, and very large span. Similarly, a four forward speed single reverse gearbox with modest span can be transformed into a gearbox with five forward speeds, two reverse speeds, and very large span.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is a chart containing a preferred number of teeth for each of the gears of the transaxle of FIG. 1;

FIG. 3 is a chart containing the speed ratios between the input and output and steps between the speed ratios for each of the forward and reverse speeds of the transaxle of FIG. 1, the gears having the number of teeth shown in FIG. 2;

FIG. 5 is a chart containing a preferred number of teeth for each of the gears of the transmission of FIG. 4;

FIG. 6 is a chart containing the speed ratios between the input and output and steps between the speed ratios for each of the forward and reverse speeds of the transmission of FIG. 4, the gears having the number of teeth shown in FIG. 5.

DETAILED DESCRIPTION OF THE PREFERRED EMBODIMENT

Figure 1:
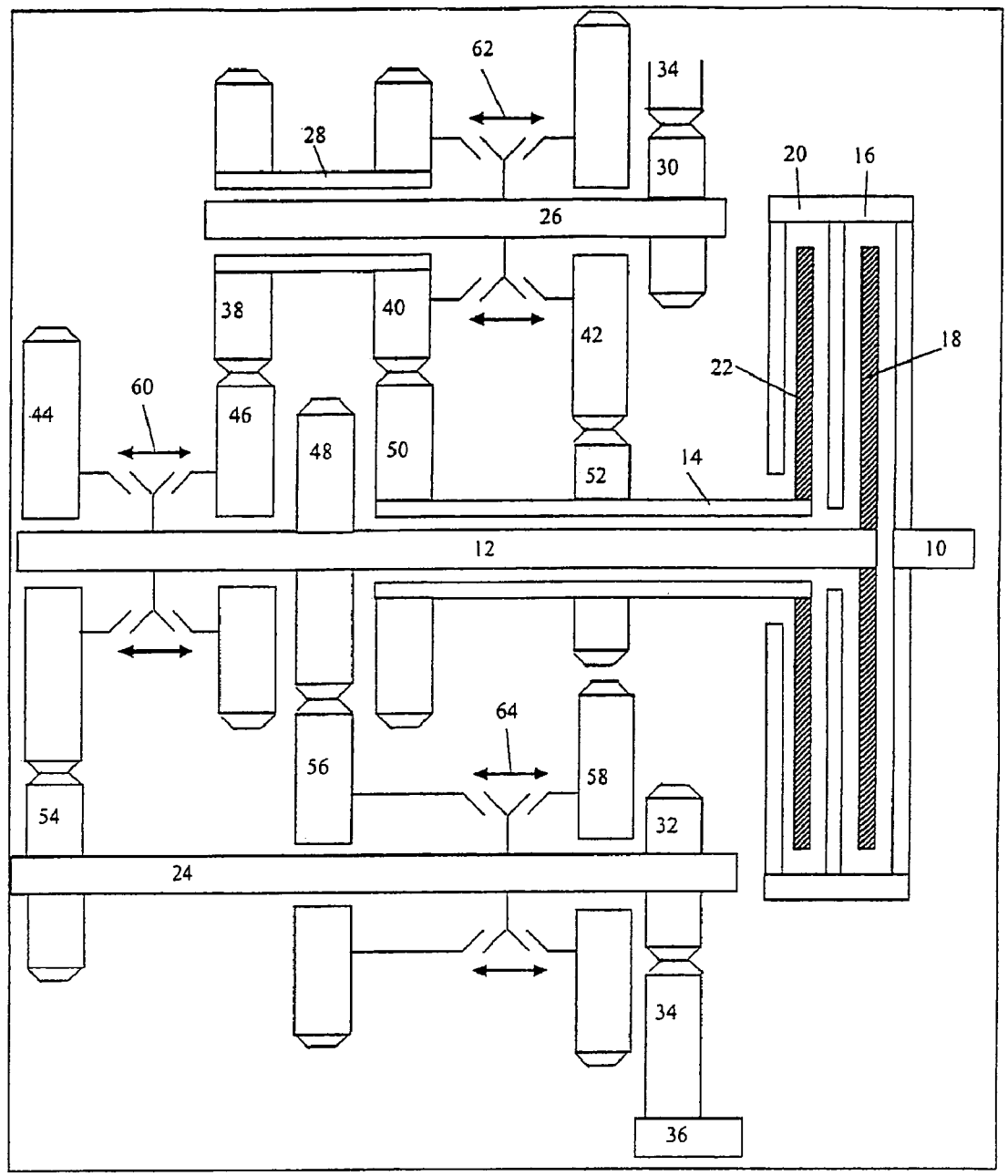
FIG. 1 is a schematic diagram showing a five forward speed front wheel drive transaxle.

Referring to FIG. 1, a transaxle includes an input 10 for driveably connecting a power source, such as an internal combustion engine or electric motor, to the transmission, and an output 36 for driving a load, such as the driven wheels of a motor vehicle, through a powertrain that may include a drive shaft, differential mechanism, and axle shafts. A first friction clutch 20, consisting of a clutch housing and a clutch disc 22, alternately connects and disconnects a first input shaft 14 as clutch 20 is engaged and disengaged, respectively. A second friction clutch 16, consisting of a clutch housing and a clutch disc 18, connects and disconnects a second input shaft 12 as clutch 16 is engaged and disengaged, respectively.

A first layshaft 26 supports a first output pinion 30, which is secured to layshaft 26 in continuous meshing engagement with an output ring gear 34, secured to output 36. A second layshaft 24 supports a second output pinion 32, which is secured to the layshaft 24 in continuous meshing engagement with output ring gear 34.

The first input shaft 14 supports two pinions 50 and 52 which are secured to shaft 14. The second input shaft 12 supports one pinion 48 which is secured to shaft 12 and two pinions 44 and 46 which may rotate about shaft 12. Gear 42 is supported on layshaft 26 for rotation relative to layshaft 26, and in continuous meshing engagements with pinion 52. Auxiliary shaft 28 is a hollow shaft supported on layshaft 26 for rotation relative to layshaft 26. The auxiliary shaft 28 supports gears 38 and 40 which are secured to shaft 28 and in continuous meshing engagement with pinions 46 and 50 respectively. Gear 54 is secured to layshaft 24 and in continuous meshing engagement with pinion 44. Gears 56 and 58 are supported on layshaft 24 for rotation relative to layshaft 24 and in continuous meshing engagement with pinion 48 and gear 42, respectively. Couplers 60, 62, and 64 are preferably synchronizers of the type used in automotive manual transmissions to connect a gear or pinion to a shaft, after synchronizing the speed of the shaft and that of the pinion or gear. Each coupler may 15 also disconnect the shaft and the associated pinion or gear. Alternatively, each coupler may be a dog clutch having teeth that are engaged with dog teeth on a gear or pinion. Couplers may be in any combination of synchronizers and dog clutches. Each coupler is composed of a hub secured to the shaft and a sleeve which is supported on the hub for sliding movement leftward or rightward into engagement with dog teeth on the adjacent gear or pinion. In the case where a coupler is a synchronizer, it is provided with a conical surface, which engages mutually with a corresponding conical surface located on the gear or pinion. When the synchronizer is engaging either of its adjacent gears, these conical surfaces are forced together into frictional contact, and that frictional engagement synchronizes the speed of the gear to that of the shaft before the dog teeth engage. Other types of synchronizers or couplers, now know or later invented, may also be used.

Coupler 60 connects second input shaft 12 to pinion 44, pinion 46, or disconnects it from both. Coupler 60 is the clutch coupler. Coupler 62 connects layshaft 26 to gear 40, gear 42, or disconnects it from both. Coupler 64 connects layshaft 24 to gear 56, gear 58, or disconnects it from both.

Engaging coupler 60 to pinion 46 activates a power path between the first and second input shaft comprising pinion 50, gear 40, auxiliary shaft 28, gear 38, pinion 5 46, and coupler 60.

To accelerate the vehicle using the first forward speed, the transmission is configured with coupler 60 engaging pinion 46 and coupler 62 engaging gear 42. Then, clutch 16 is engaged. The power path for this speed comprises input 10, clutch 16, input shaft 12, coupler 60, pinion 46, gear 38, auxiliary shaft 28, gear 40, and pinion 50, input shaft 14, pinion 52, gear 42, coupler 62, layshaft 26, output pinion 30, output gear 34, and output 36. Input 10 is driveably connected to shaft 12 through clutch 16. Shaft 12 is driveably connected to pinion 46 through coupler 60. Pinion 46 drives gear 38, auxiliary shaft 28, gear 40, pinion 50, shaft 14, pinion 52, and gear 42. Gear 42 is driveably connected to layshaft 26 through coupler 62. Pinion 30 is secured to layshaft 26 and drives ring gear 34 and output 36.

To shift from the first forward speed to the second forward speed, clutch 20 is progressively engaged while clutch 16 is progressively released. Following the shift, coupler 60 may be moved to the neutral position, but in any event must be moved to the neutral position before the next odd-to-even upshift. The power path for this speed comprises input 10, clutch 20, input shaft 14, pinion 52, gear 42, coupler 62, layshaft 26, output pinion 30, output gear 34, and output 36. Input 10 is driveably connected to shaft 14 and pinion 52 through clutch 20. Pinion 52 drives gear 42, which is driveably connected to shaft 26 through coupler 62. Pinion 30 is secured to shaft 26 and drives ring gear 34 and output 36.

To shift from the second forward speed to the third forward speed, the transmission is configured by displacing coupler 64 to engage gear 56, then clutch 16 is progressively engaged while clutch 20 is progressively released. Following the shift, coupler 62 may be moved to the neutral position. The power path for this speed comprises input 10, clutch 16, input shaft 12, pinion 48, gear 56, coupler 64, layshaft 24, output pinion 32, output gear 34, and output 36. Input 10 is driveably connected to shaft 12 and pinion 48 through clutch 16. Pinion 48 drives gear 56, which is driveably connected to shaft 24 through coupler 64. Pinion 32 is secured to shaft 24 and drives ring gear 34 and output 36.

To shift from the third forward speed to the fourth forward speed, the transmission is configured by displacing coupler 62 to engage gear 40, then clutch 20 is progressively engaged while clutch 16 is progressively released. Following the shift, coupler 64 may be moved to the neutral position. The power path for this speed comprises input 10, clutch 20, input shaft 14, pinion 50, gear 40, coupler 62, layshaft 26, output pinion 30, output gear 34, and output 36. Input 10 is driveably connected to shaft 14 and pinion 50 through clutch 20. Pinion 50 drives gear 40, which is driveably connected to shaft 26 through coupler 62. Pinion 30 is secured to shaft 26 and drives ring gear 34 and output 36.

To shift from the fourth forward speed to the fifth forward speed, the transmission is configured by displacing coupler 60 to engage pinion 44, then clutch 16 is progressively engaged while clutch 20 is progressively released. Following the shift, coupler 62 may be moved to the neutral position. The power path for this speed comprises input 10, clutch 16, input shaft 12, coupler 60, pinion 44, gear 54, layshaft 24, output pinion 32, output gear 34, and output 36. Input 10 is driveably connected to shaft 12 through clutch 16. Shaft 12 is driveably connected to pinion 44 through coupler 60. Pinion 44 drives gear 54, shaft 24, pinion 30, ring gear 34, and output 36. Downshifts are accomplished by reversing the steps of the corresponding upshift.

To accelerate the vehicle in reverse, the transmission is configured with coupler 60 engaging pinion 46 and coupler 64 engaging gear 58. Then, clutch 16 is engaged. The power path for this speed comprises input 10, clutch 16, input shaft 12, coupler 60, pinion 46, gear 38, auxiliary shaft 28, gear 40, pinion 50, input shaft 14, pinion 52, gear 42, gear 58, coupler 64, layshaft 24, output pinion 32, output gear 34, and output 36. Input 10 is driveably connected to shaft 12 through clutch 16. Shaft 12 is driveably connected to pinion 46 through coupler 60. Pinion 46 drives gear 38, auxiliary shaft 28, gear 40, pinion 50, shaft 14, pinion 52, gear 42, and gear 58. Gear 58 is driveably connected to layshaft 24 through coupler 64. Pinion 32 is secured to layshaft 24 and drives ring gear 34 and output 36.

A shift may be accomplished in reverse by progressively engaging clutch 20 while progressively releasing clutch 16. The power path for this speed comprises input 10, clutch 20, input shaft 14, pinion 52, gear 42, gear 58, coupler 64, layshaft 24, output pinion 32, output gear 34, and output 36. Following the shift, input 10 is driveably connected to shaft 14 and pinion 52 through clutch 20. Pinion 52 drives gear 42 and gear 58, which is driveably connected to shaft 24 through coupler 64. Pinion 32 is secured to shaft 24 and drives ring gear 34 and output 36.

A chart containing a preferred number of teeth for each of the gears of the transaxle of FIG. 1 is shown in FIG. 2, while FIG. 3 is a chart containing the speed ratios between the input and output and steps between the speed ratios for each of the forward and reverse speeds of the transaxle of FIG. 1.

Figure 4:
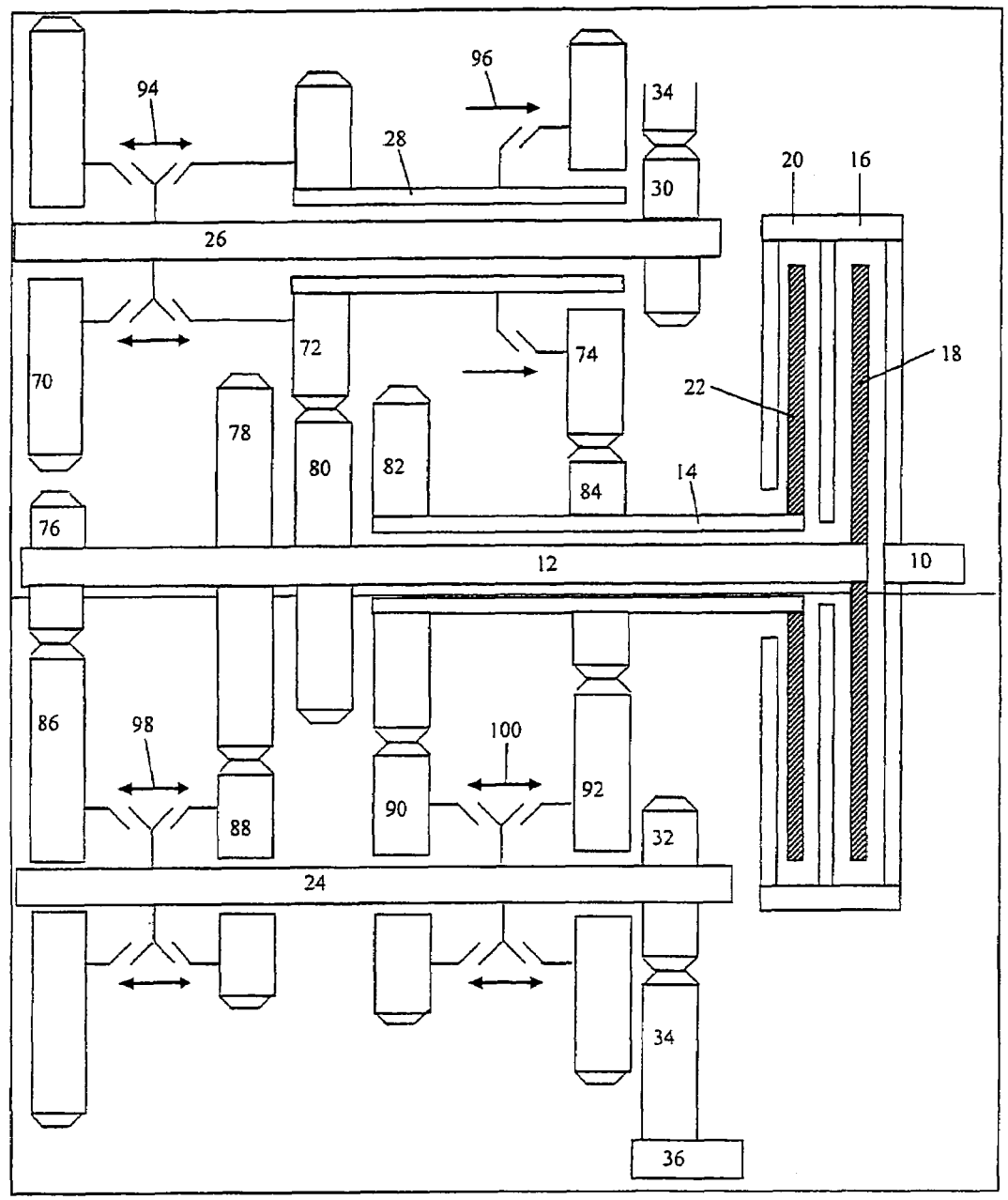
FIG. 4 is a schematic diagram showing a seven forward speed, two reverse speed front wheel drive transaxle.

Referring now to FIG. 4, a transaxle includes an input 10 for driveably connecting a power source, such as an internal combustion engine or electric motor, to the transmission, and an output 36 for driving a load, such as the driven wheels of a motor vehicle, through a powertrain that may include a drive shaft, differential mechanism, and axle shafts. A first friction clutch 16, consisting of a clutch housing and a clutch disc 18, alternately connects and disconnects a first input shaft 12 as clutch 16 is engaged and disengaged, respectively. A second friction clutch 20, consisting of a clutch housing and a clutch disc 22, connects and disconnects a second input shaft 14 as clutch 20 is engaged and disengaged, respectively.

A first layshaft 26 supports a first output pinion 30, which is secured to layshaft 26 in continuous meshing engagement with an output ring gear 34, secured to output 36. A second layshaft 24 supports a second output pinion 32, which is secured to the layshaft in continuous meshing engagement with output ring gear 34. The second input shaft 14 supports two pinions 82 and 84 which are secured to shaft 14. The first input shaft 12 supports three pinions 76, 78, and 80 which are secured to shaft 12. Gears 86, 88, 90, and 92 are supported on layshaft 24 for rotation relative to layshaft 24 and in continuous meshing engagement with pinions 76, 78, 82, and 84 respectively. Gear 70 is supported on layshaft 26 for rotation relative to layshaft 26, and in continuous meshing engagement with gear 86. Auxiliary shaft 28 is a hollow shaft supported on layshaft 26 for rotation relative to layshaft 26. Auxiliary shaft 28 supports gear 72 which is secured to shaft 28 and in continuous meshing engagement with pinion 80. Gear 74 is supported on shaft 28 for rotation relative to shaft 28 and in continuous meshing engagement with pinion 84.

Coupler 94 connects layshaft 26 to gear 70, gear 72, or disconnects it from both. Coupler 96 connects or disconnects auxiliary shaft 28 to gear 74. Coupler 98 connects layshaft 24 to gear 86, gear 88, or disconnects it from both. Coupler 100 connects layshaft 24 to gear 90, gear 92, or disconnects it from both.

Coupler 96 is the clutch coupler. Engaging coupler 96 to gear 74 activates a power path between the first and second input shaft comprising pinion 84, gear 74, coupler 96, auxiliary shaft 28, gear 72, and pinion 80.

To accelerate the vehicle using the first forward speed, the transmission is configured with coupler 96 engaging gear 74 and coupler 98 engaging gear 86. Then, clutch 20 is engaged. The power path for this speed comprises input 10, clutch 20, input shaft 14, pinion 84, gear 74, coupler 96, auxiliary shaft 28, gear 72, pinion 80, input shaft 12, pinion 76, gear 86, coupler 98, layshaft 24, output pinion 32, output gear 34, and output 36. Input 10 is driveably connected to shaft 14 and pinion 84 through clutch 20. Pinion 84 drives gear 74, which is driveably connected to auxiliary shaft 28 through coupler 96. Auxiliary shaft 28 drives gear 72, pinion 80, shaft 12, pinion 76, and gear 86. Gear 86 is driveably connected to layshaft 24 through coupler 98. Pinion 32 is secured to layshaft 24 and drives ring gear 34 and output 36.

To shift from the first forward speed to the second forward speed, clutch 16 is progressively engaged while clutch 20 is progressively released. Following the shift, coupler 96 may be moved to the neutral position. The power path for this speed comprises input 10, clutch 16, input shaft 12, pinion 76, gear 86, coupler 98, layshaft. 24, output pinion 32, output gear 34, and output 36. Input 10 is driveably connected to shaft 12 and pinion 76 through clutch 16. Pinion 76 drives gear 86, which is driveably connected to shaft 24 through coupler 98. Pinion 32 is secured to shaft 24 and drives ring gear 34 and output 36. To shift from the second forward speed to the third forward speed, the transmission is configured by displacing coupler 100 to engage gear 92, then clutch 20 is progressively engaged while clutch 16 is progressively released. Following the shift, coupler 98 may be moved to the neutral position. The power path for this speed comprises input 10, clutch 20, input shaft 14, pinion 84, gear 92, coupler 100, layshaft 24, output pinion 32, output gear 34, and output 36. Input 10 is driveably connected to shaft 14 and pinion 84 through clutch 20. Pinion 84 drives gear 92, which is driveably connected to shaft 24 through coupler 100. Pinion 32 is secured to shaft 24 and drives ring gear 34 and output 36.

To shift from the third forward speed to the fourth forward speed, the transmission is configured by displacing coupler 94 to engage gear 72, then clutch 16 is progressively engaged while clutch 20 is progressively released. Following the shift, coupler 100 may be moved to the neutral position. The power path for this speed comprises input 10, clutch 16, input shaft 12, pinion 80, gear 72, coupler 94, layshaft 26, output pinion 30, output gear 34, and output 36. Input 10 is driveably connected to shaft 12 and pinion 80 through clutch 16. Pinion 80 drives gear 72, which is driveably connected to shaft 26 through coupler 94. Pinion 30 is secured to shaft 26 and drives ring gear 34 and output 36.

To shift from the fourth forward speed to the fifth forward speed, the transmission is configured by displacing coupler 100 to engage gear 90, then clutch 20 is progressively engaged while clutch 16 is progressively released. Following the shift, coupler 94 may be moved to the neutral position. The power path for this speed comprises input 10, clutch 20, input shaft 14, pinion 82, gear 90, coupler 100, layshaft 24, output pinion 32, output gear 34, and output 36. Input 10 is driveably connected to shaft 14 and pinion 82 through clutch 20. Pinion 82 drives gear 90, which is driveably connected to shaft 24 through coupler 100. Pinion 32 is secured to shaft 24 and drives ring gear 34 and output 36.

To shift from the fifth forward speed to the sixth forward speed, the transmission is configured by displacing coupler 98 to engage gear 88, then clutch 16 is progressively engaged while clutch 20 is progressively released. Following the shift, coupler 100 may be moved to the neutral position. The power path for this speed comprises input 10, clutch 16, input shaft 12, pinion 78, gear 88, coupler 98, layshaft 24, output pinion 32, output gear 34, and output 36. Input 10 is driveably connected to shaft 12 and pinion 78 through clutch 16. Pinion 78 drives gear 88, which is driveably connected to shaft 24 through coupler 98. Pinion 32 is secured to shaft 24 and drives ring gear 34 and output 36.

An upshift from the sixth forward speed to the seventh forward speed, unlike all other single step shifts, requires a torque break, i.e., the torsional connection between the input 10 and output 36 is briefly interrupted by disengaging clutch 16 while the state of the couplers are changed. This is mitigated because the 6-7 upshift is never made at high throttle; instead, it usually occurs as a result of the driver reducing power demand when reaching cruising speed. While both clutches are disengaged, coupler 98 is moved to the neutral position, coupler 96 is displaced to engage gear 74, and coupler 100 is displaced to engage gear 90. Then, clutch 16 is reengaged. The power path for this speed comprises input 10, clutch 16, input shaft 12, pinion 80, gear 72, auxiliary shaft 28, coupler 96, gear 74, pinion 84, input shaft 14, pinion 82, gear 90, coupler 100, layshaft 24, output pinion 32, output gear 34, and output 36. When clutch 16 is re-engaged, input 10 is driveably connected to shaft 12 and pinion 80 through clutch 16. Pinion 80 drives gear 72 and auxiliary shaft 28, which is driveably connected to gear 74 through coupler 96. Gear 74 drives pinion 84, shaft 14, pinion 82, and gear 90, which is driveably connected to shaft 24 through coupler 100. Pinion 32 is secured to shaft 24 and drives ring gear 34 and output 36.

Downshifts are accomplished by reversing the steps of the corresponding upshift. To accelerate the vehicle in reverse, the transmission is configured with coupler 96 engaging gear 74 and coupler 94 engaging gear 70. Then, clutch 20 is engaged. The power path for this speed comprises input 10, clutch 20, input shaft 14, pinion 84, gear 74, coupler 96, auxiliary shaft 28, gear 72, pinion 80, input shaft 12, pinion 76, gear 86, gear 70, coupler 94, layshaft 26, output pinion 30, output gear 34, and output 36. Input 10 is driveably connected to shaft 14 and pinion 84 through clutch 20. Pinion 84 drives gear 74, which is driveably connected to auxiliary shaft 28 through coupler 96. Auxiliary shaft 28 drives gear 72, pinion 80, shaft 12, pinion 76, gear 86, and gear 70. Gear 70 is driveably connected to layshaft 26 through coupler 94. Pinion 30 is secured to layshaft 26 and drives ring gear 34 and output 36.

A shift may be accomplished in reverse by progressively engaging clutch 16 while progressively releasing clutch 20. The power path for this speed comprises input 10, clutch 16, input shaft 12, pinion 76, gear 86, gear 70, coupler 94, layshaft 26, output pinion 30, output gear 34, and output 36. Following the shift, input 10 is driveably connected to shaft 12 and pinion 76 through clutch 16. Pinion 76 drives gear 86 and gear 70, which is driveably connected to shaft 26 through coupler 94. Pinion 30 is secured to shaft 26 and drives ring gear 34 and output 36.

A chart containing a preferred number of teeth for each of the gears of the transaxle of FIG. 4 is shown in FIG. 5, while FIG. 6 is a chart containing the speed ratios between the input and output and steps between the speed ratios for each of the forward and reverse speeds of the transaxle of FIG. 4, the gears having the number of teeth shown in FIG. 5.

Figure 7:
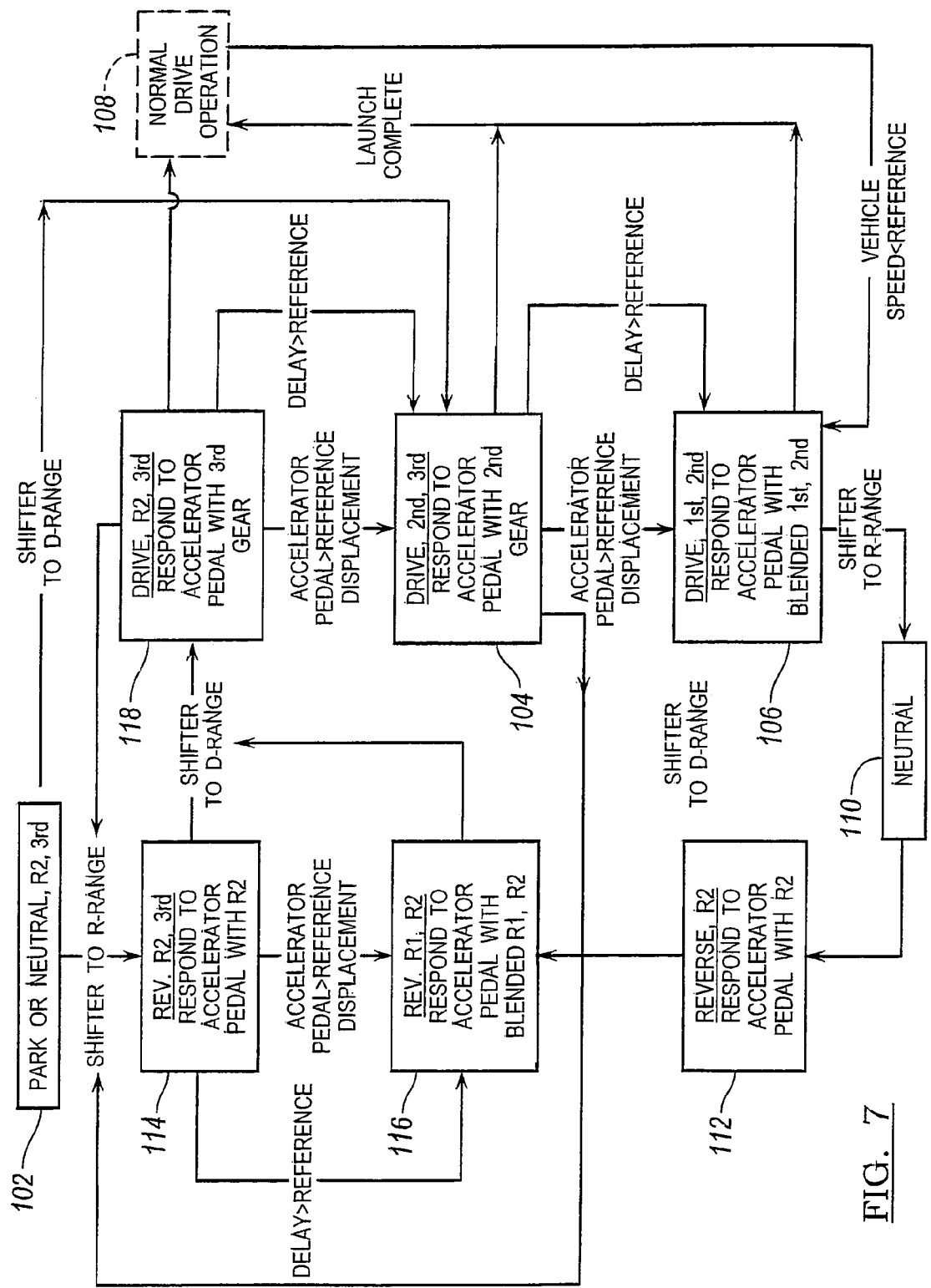
FIG. 7 is a state transition diagram illustrating the gear shift control strategy.

FIG. 7 illustrates the gear shift control strategy with a state transition diagram. The boxes represent control states. Text in the boxes indicates the clutches that would be used to provide requested torque in that state. The arrows indicate conditions that trigger changes in state.

Referring to FIG. 7, the steps for controlling gear shifts of a dual clutch transmission, such as the transaxle illustrated in FIG. 4, begins at step 102 with the power source transmitting power to the input 10 and the transaxle prepared for operation in Park or Neutral or in R2 gear, wherein coupler 94 connects gear 70 and layshaft 26 or in third gear, wherein coupler 100 connects gear 92 and layshaft 24; and with clutches 16, 20 disengaged. If the gear selector is in the Park or P-range position, the output 36 is also held against rotation by a parking pawl device (not illustrated).

When the gear selector is moved by the vehicle operator from Park or Neutral to the Drive or D-range position, control passes to step 104 where R2 gear is disengaged by moving coupler 94 to its neutral position thereby disconnecting gear 70 from layshaft 26, and second gear is engaged by coupler 98 connecting gear 86 and layshaft 24. At step 104 with the transaxle so prepared, clutch 16 is engaged, the control responds to displacement of the accelerator pedal, and the vehicle is launched, i.e., accelerated from a stopped condition, in second gear with third gear preselected in anticipation of a 2-3 upshift.

If, however, the accelerator pedal is depressed more than a reference displacement, indicating the operator desires faster vehicle speed, or if the length of the period during which second gear is engaged exceeds a reference length, indicating that clutch 16 may be slipping excessively long, control passes to step 106 where third gear is disengaged by moving coupler 100 to its neutral position thereby disconnecting gear 92 from layshaft 24, and first gear is engaged by causing coupler 96 to connect gear 74 and layshaft 28.

With the transaxle so prepared, clutches 16 and 20 are used together to produce a blended vehicle launch in first gear and second gear by varying the torque capacity of clutches 16 and 20 during the vehicle launch. Preferably in the earliest portion of the vehicle launch, the torque capacity of clutch 20 is greater than the torque capacity of clutch 16, and in the latter portion of the vehicle launch the torque capacity of clutch 16 is greater than that of clutch 20. In this way, the 1-2 vehicle launch begins in first gear and ends in second gear with clutch 16 fully engaged and clutch 20 fully disengaged. The blended forward vehicle launch prevents excessive wear of clutch 16 and responds to the driver's demand for a speedier launch.

If, at step 106 during a blended 1-2 vehicle launch, the operator moves the gear selector to the Reverse or R-range position, the transaxle's gear shift control transitions quickly to and through step 110, where neutral is produced by disengaging first gear coupler 96 and second gear coupler 86. Thereafter, control passes promptly to step 112, where the transaxle is prepared for operation in reverse drive, specifically in the R2 gear with coupler 94 connecting gear 70 and layshaft 26. With the transaxle so prepared, clutch 16 is engaged and the vehicle accelerates in response to accelerator pedal position in the R2 gear. Alternatively, a reverse vehicle launch in first and second gears upon bleeding operation of clutches 16 and 20 occurs at step 116, as described below.

If, at the initial step 102 with the source transmitting power to the input 10 and the transaxle prepared for operation in Park, R2 gear and third gear and clutches 16, 20 disengaged, the operator moves the gear selector to the Reverse or R-range position, control passes to step 114 where R2 gear remains engaged due to its coupler 94 connecting gear 70 and layshaft 26, and third gear remains engaged due to its coupler 100 connecting gear 92 and layshaft 24. With the transaxle so prepared, clutch 16 is engaged, the control responds to displacement of the accelerator pedal, and the vehicle is launched in the R2 gear with third gear preselected in anticipation of a R2-3 shift.

If, however, the accelerator pedal is depressed more than a reference displacement, indicating the operator desires faster reverse vehicle speed, or if the length of the period during which R2 gear and clutch 16 are engaged exceeds a reference length, indicating that clutch 16 may be slipping excessively long, control passes to step 116 where R2 gear remains engaged, third gear is disengaged by moving coupler 100 to its neutral position, and R1 gear is engaged by causing coupler 96 to connect gear 74 and layshaft 28. With the transaxle so prepared at step 116, clutches 16 and 20 are used together to produce a blended reverse vehicle launch in R1 gear and R2 gear by varying the torque capacity of clutches 16 and 20 during the reverse vehicle launch. Preferably in the earliest portion of the reverse vehicle launch, the torque capacity of clutch 20 is greater than the torque capacity of clutch 16, and in the latter portion of the reverse vehicle launch the torque capacity of clutch 16 is greater than that of clutch 20. In this way, the R1-R2 launch begins in R1 gear and ends in R2 gear with clutch 16 fully engaged and clutch 20 fully disengaged. The blended reverse vehicle launch prevents wear of clutch 16 and responds to the driver's demand for a speedier launch.

Movement of the gear selector between the D-range position and the R-range position during a forward or reverse vehicle launch indicates that the vehicle is being rock cycled, which is usually performed to free the wheels from ice, snow, mud, sand, or another material that prevent adequate wheel traction on the drive surface.

Whether the reverse launch occurs at step 114 or step 116, if during the reverse launch, the operator moves the gear selector to the Drive or D-range position, control passes to step 118, where the R2 gear coupler 94 remains engaged with gear 70, R1 gear is disengaged, and third gear is engaged by causing coupler 100 to connect gear 92 and layshaft 24. With the transaxle so prepared at step 118, clutch 20 is engaged, and the control responds to accelerator pedal position and accelerates the vehicle in third gear.

If, with the control operating in step 118, the gear selector is moved to the R-range within a reference period length, thereby indicating that the rock cycling is not completed, the control passes to step 114, where the vehicle is accelerated in the R2 gear, as described above with reference to step 114.

If, with the control operating in step 118, the gear selector remains in the D-position longer than a reference period length, or the accelerator pedal is depressed greater than a reference magnitude, control passes from step 118 to step 104 for a vehicle launch in second gear, as described above with reference to step 104.

If, with the control operating in step 104, the gear selector is not moved to the R-range within a reference period length, thereby indicating that the rock cycling is completed, the control can pass to step 106, where clutches 16 and 20 are used together to produce a blended vehicle launch in first gear and second gear by varying the torque capacity of clutches 16 and 20 during the vehicle launch.

If, with the control operating in step 104, the gear selector is moved to the R-range, thereby indicating that the rock cycling is not completed, control passes to step 114, the transaxle is prepared for operation in R2 gear and third gear, clutch 16 is engaged and the vehicle is accelerated in R2 gear in response to depressing the accelerator pedal.

Whether the vehicle launch occurs at step 118, step 104, or step 106, when the vehicle launch is completed, control passes to step 108, where gear shifts to higher forward gears occur as described above with reference to FIGS. 4 and 6. If vehicle speed falls below a reference vehicle speed, control passes from step 108 to step 106 for a blended vehicle launch in first and second gears.

In any state other than 108, if the gear selector is moved to the P-position or N-position, control goes to state 102.

In FIG. 7, the reference accelerator pedal displacement, reference vehicle speed and reference delays for completing a gear shift are calibratable parameters.

This gear shift control strategy ensures that the clutch coupler is engaged after the second gear coupler or the R2 gear coupler, thereby minimizing torque at the coupler at its engagement. The control also allows the transmission to stay in third gear and R2 gear during rock cycling maneuvers.

What is claimed is:

1. A method for controlling gear shifts in a transmission, comprising the steps of:
   engaging a first coupler that driveably connects a first input shaft to an output through a first power path;
   after the first coupler is engaged, engaging a clutch coupler that driveably connects a second input shaft to the output through a second power path that includes the first input shaft;
   engaging a first clutch to connect an input and the output through the clutch coupler and the second power path;
   disengaging the first clutch and engaging a second clutch to connect the input and the output through the first coupler and the first power path.

2. The method of claim 1, wherein the first clutch transmits power through a third power path that produces a second reverse gear lower than a first reverse gear, the method further comprising the steps of:
   establishing a length of a reference period;
   if a length of a period during which the transmission transmits power through the first power path is greater than the length of the reference period, preparing the transmission to transmit power through the third power path rather than the second power path, and concurrently engaging the first and second clutches.

3. The method of claim 2 further comprising the steps of:
   changing a torque capacity of the first and second clutches such that the torque capacity of the second clutch during a first portion of a reverse vehicle launch is greater than the torque capacity of the first clutch, and
   changing the torque capacity of the first and second clutches such that the torque capacity of the first clutch during a second portion of the reverse vehicle launch following the first portion is greater than the torque capacity of the second clutch.

4. The method of claim 1, wherein the first clutch transmits power through a third power path that produces a second reverse gear lower than a first reverse gear, the method further comprising the steps of:
   establishing a reference magnitude of accelerator pedal displacement;
   if a magnitude of accelerator pedal displacement while the transmission transmits power through the first power path is greater than the reference magnitude of accelerator pedal displacement, preparing the transmission to transmit power through the third power path rather than the second power path, and concurrently engaging the first and second clutches.

5. The method of claim 4 further comprising the steps of:
   changing a torque capacity of the first and second clutches such that the torque capacity of the second clutch during a first portion of a reverse vehicle launch is greater than the torque capacity of the first clutch, and
   changing the torque capacity of the first and second clutches such that the torque capacity of the first clutch during a second portion of the reverse vehicle launch following the first portion is greater than the torque capacity of the second clutch.

6. The method of claim 1, wherein the first clutch transmits power through a fourth power path that produces a second forward gear lower than the first forward gear, the method further comprising the steps of:
   establishing a length of a reference period;
   if a length of a period during which the transmission transmits power through the second power path is greater than the length of the reference period, preparing the transmission to transmit power through the fourth power path;
   disengaging the second clutch;
   engaging the first clutch; and
   transmitting power through the fourth power path in the second forward gear.

7. The method of claim 6, wherein the first clutch transmits power through a fifth power path that produces a third forward gear lower than the second forward gear, the method further comprising the steps of:
   establishing a length of a reference period;
   if a length of a period during which the transmission transmits power through the fourth power path is greater than the length of the reference period, preparing the transmission to transmit power through the fifth power path rather than the second power path; and
   concurrently engaging the first and second clutches.

8. The method of claim 7 further comprising the steps of:
   changing a torque capacity of the first and second clutches such that the torque capacity of the second clutch during a first portion of a forward vehicle launch is greater than the torque capacity of the first clutch; and
   changing the torque capacity of the first and second clutches such that the torque capacity of the first clutch during a second portion of the forward vehicle launch following the first portion is greater than the torque capacity of the second clutch.

9. The method of claim 6, wherein the first clutch transmits power through a fifth power path that produces a third forward gear lower than the second forward gear, the method further comprising the steps of:
   establishing a reference magnitude of accelerator pedal displacement;
   if a magnitude of accelerator pedal displacement while the transmission transmits power through the first power path is greater than the reference magnitude of accelerator pedal displacement, preparing the transmission to transmit power through the fifth power path rather than the second power path; and
   concurrently engaging first and second clutches.

10. The method of claim 9 further comprising the steps of:
    changing a torque capacity of the first and second clutches such that the torque capacity of the second clutch during a first portion of a forward launch is greater than the torque capacity of the first clutch; and
    changing the torque capacity of the first and second clutches such that the torque capacity of the first clutch during a second portion of the forward vehicle launch following the first portion is greater than the torque capacity of the second clutch.

11. A method for controlling gear shifts in a transmission, comprising the steps of:
    engaging a first coupler that driveably connects a first input shaft to an output through a first power path that produces a first forward gear; and
    after the first coupler is engaged, engaging a clutch coupler that driveably connects a second input shaft to the output through a second power path that includes the first input shaft and produces a second forward gear lower than the first gear;
    engaging a first clutch to connect an input and the output and produce the second gear through the clutch coupler and the second power path.

12. A method for controlling gear shifts in a transmission, comprising the steps of:

engaging a first coupler that driveably connects a first input shaft to an output through a first power path that produces a first reverse gear;

after the first coupler is engaged, engaging a clutch coupler that driveably connects a second input shaft to the output through a second power path that includes the first input shaft and produces a second reverse gear lower than the first gear;

engaging a first clutch to connect an input and the output and produce the second reverse gear through the clutch coupler and the second power path.

13. The method of claim 11 further comprising disengaging the first clutch and engaging the second clutch to connect the input and the output and produce the second gear through the first coupler and the first power path.

14. The method of claim 12 further comprising disengaging the first clutch and engaging the second clutch to connect the input and the output and produce the reverse gear through the first coupler and the first power path.

* * * * *